United States Patent [19]

Lemaire et al.

[11] Patent Number: 4,823,934

[45] Date of Patent: Apr. 25, 1989

[54] DEVICE FOR GRIPPING AND HOLDING BACK ARTICLES, SUCH AS FOR EXAMPLE CONTAINERS, ON A CONVEYOR, AND CONVEYOR EQUIPPED WITH THIS DEVICE

[75] Inventors: Didier Lemaire, Cherisy; Jean-Marc Dronet, Putanges Pont Ecrepin, both of France

[73] Assignee: E. P. Remy & Cie., France

[21] Appl. No.: 126,579

[22] Filed: Nov. 30, 1987

[30] Foreign Application Priority Data

Dec. 1, 1986 [FR] France ............................... 86 16752

[51] Int. Cl.$^4$ ............................................. B65G 37/00
[52] U.S. Cl. .............................. 198/470.1; 198/476.1; 198/803.7
[58] Field of Search ............... 198/803.7, 803.9, 470.1, 198/474.1, 476.1, 477.1

[56] References Cited

U.S. PATENT DOCUMENTS

| 1,296,547 | 3/1919 | Miller | 198/803.7 |
|---|---|---|---|
| 1,724,336 | 8/1929 | Ayers | 198/803.9 |
| 2,223,060 | 11/1940 | Dostal | 198/803.9 |
| 2,237,756 | 4/1941 | Dostal | 198/803.9 |
| 2,249,659 | 7/1941 | Kerns et al. | 214/1.1 |
| 2,430,878 | 11/1947 | Kimball | 198/803.7 X |
| 2,667,958 | 2/1954 | Malhiot | 198/470.1 X |
| 2,685,360 | 8/1954 | Kaplan | 198/803.7 X |
| 2,884,117 | 4/1959 | Engelson et al. | 198/803.9 |
| 2,938,620 | 5/1960 | Waters | 198/803.9 X |
| 3,669,246 | 7/1972 | Risi | 198/803.7 |
| 3,703,954 | 11/1972 | Gudmestad | 198/803.7 |
| 4,015,704 | 4/1977 | Warren | 198/803.7 X |
| 4,041,672 | 8/1977 | Gularte | 198/803.9 X |

FOREIGN PATENT DOCUMENTS

| 2134985 | 1/1973 | Fed. Rep. of Germany . |
|---|---|---|
| 1070445 | 7/1954 | France . |
| 58-31811 | 5/1983 | Japan . |

Primary Examiner—Robert J. Spar
Assistant Examiner—D. Glenn Dayoan
Attorney, Agent, or Firm—Steinberg & Raskin

[57] ABSTRACT

The present invention concerns a device for gripping and holding back containers having two casings solid respectively with two chains, each of these casings including two racks engaging with a pinion which actuates in a synchronized manner both racks, each of which is coupled to one end of two transversal plates with respect to the chains, which plates can be simultaneously spaced apart and brought together to adapt to containers of any shape and dimension.

7 Claims, 3 Drawing Sheets

U.S. Patent    Apr. 25, 1989    Sheet 1 of 3    4,823,934
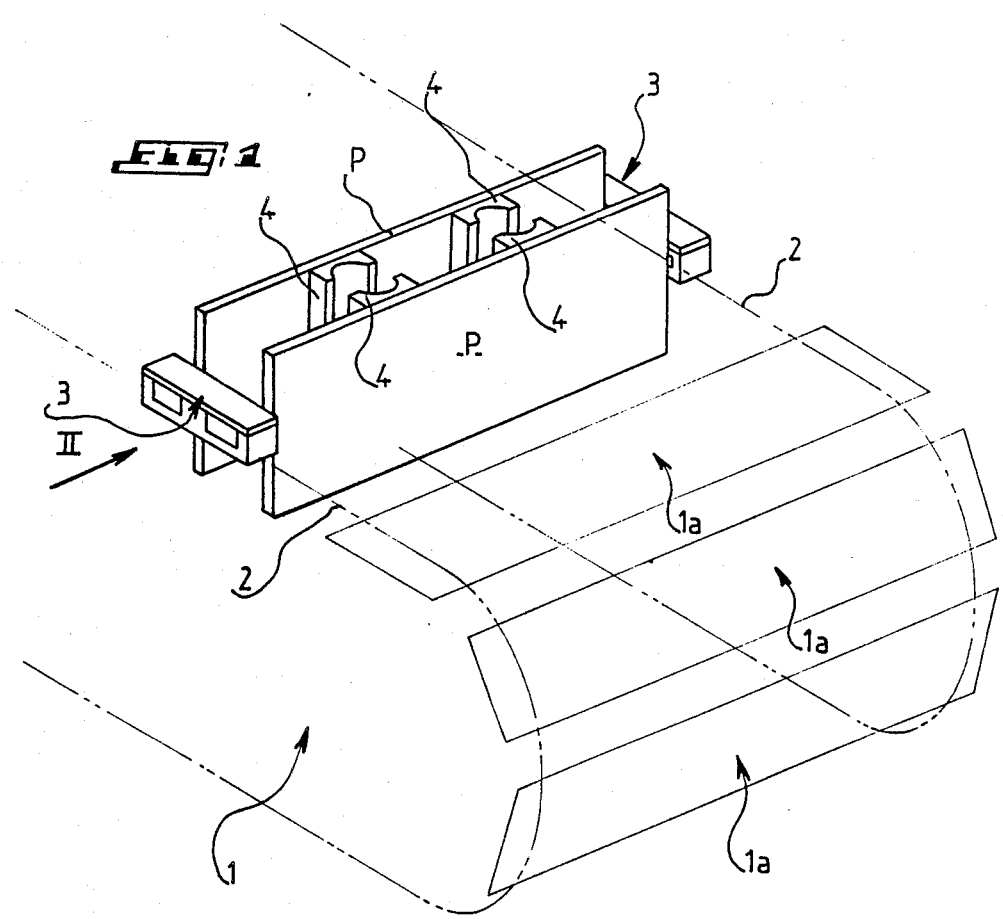
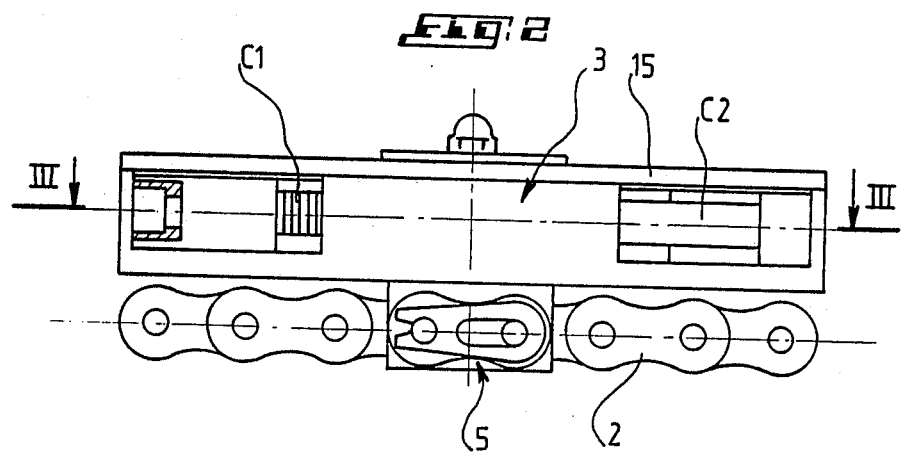

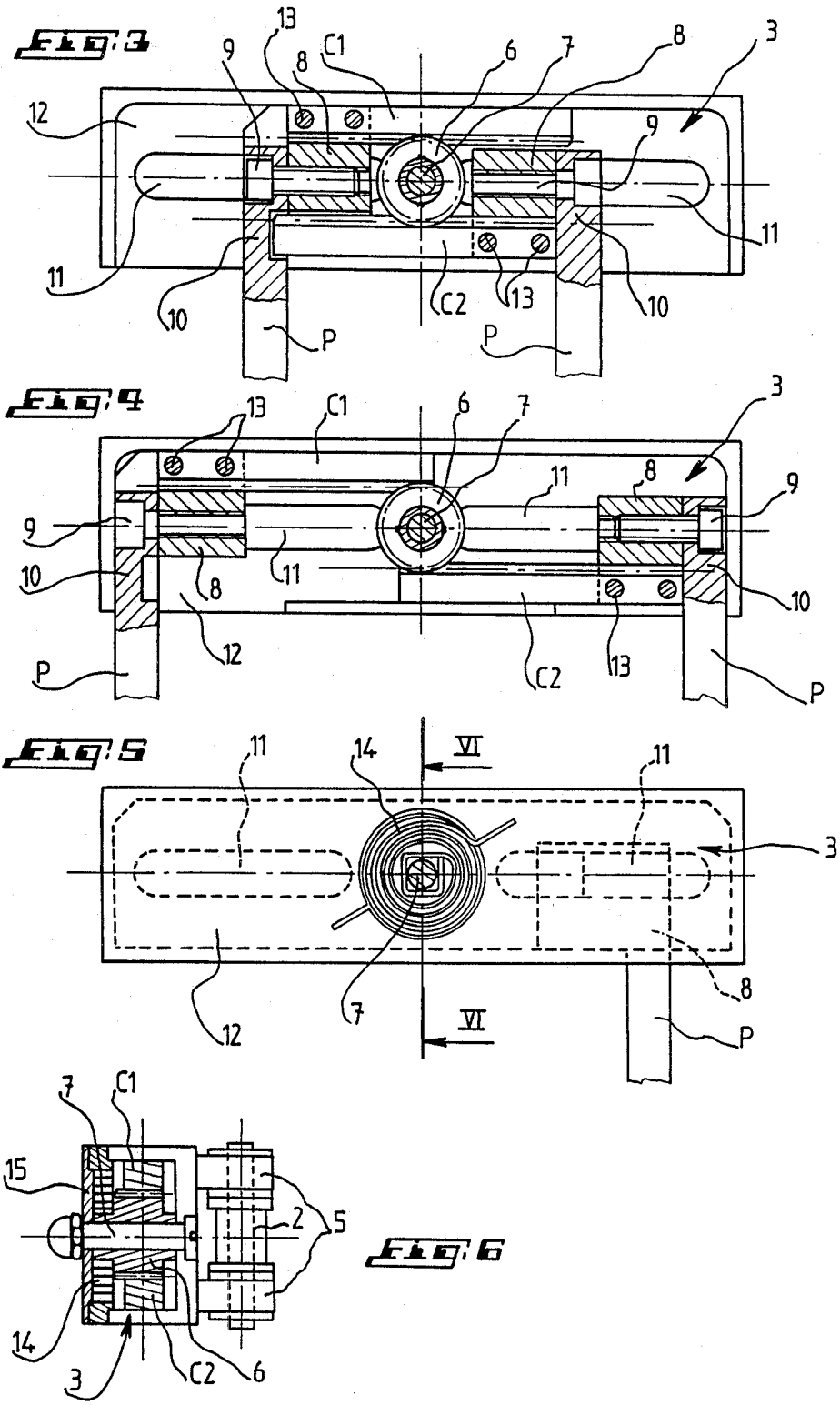

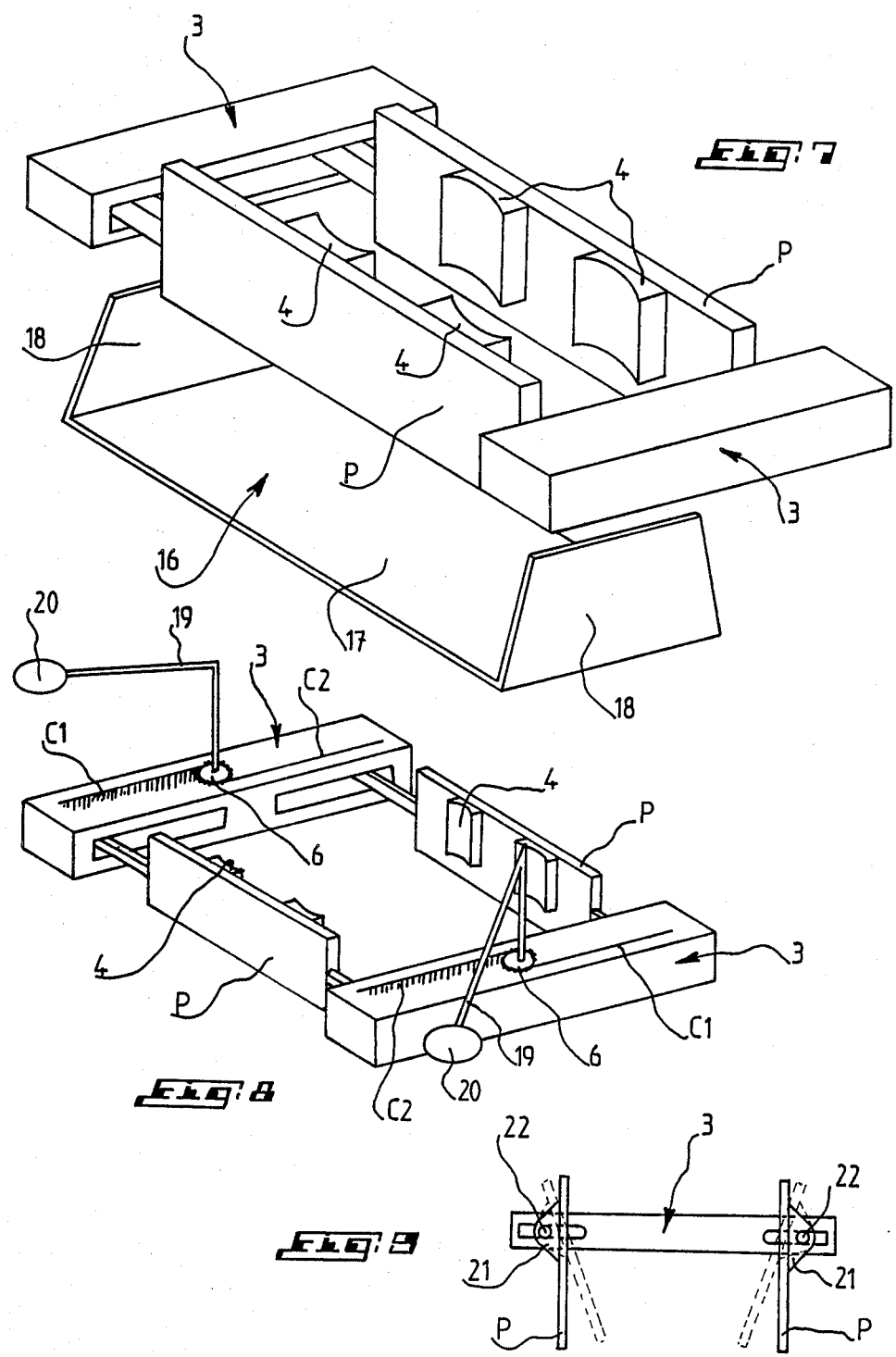

4,823,934

DEVICE FOR GRIPPING AND HOLDING BACK ARTICLES, SUCH AS FOR EXAMPLE CONTAINERS, ON A CONVEYOR, AND CONVEYOR EQUIPPED WITH THIS DEVICE

BACKGROUND OF THE INVENTION

The present invention is concerned essentially with a device for gripping and holding back articles, such as for example containers, on a conveyor with two chains, belts or similar.

The invention is also concerned with a conveyor equipped with this device.

Known in the art are conveyors with two endless chains or belts fitted with transverse plates whose ends are solid with both chains or belts and comprising apertures likely to receive containers or goblets which can thus be transported from one point to another point along rows of containers or goblets intended for being filled with any product and then for being closed with a lid.

When it is desired to process containers of different dimensions, it is necessary to change the transverse support plates of these containers, which, as it will be understood, represents a serious drawback concerning the costs and the labour.

SUMMARY OF THE INVENTION

Accordingly, the object of the present invention is to obviate the abovementioned drawbacks by proposing a device associated with the chains of a conveyor and which can be adapted to any shapes and/or dimensions of the containers intended for being transported by said conveyor.

Therefore, the object of this invention is a device for gripping and holding back articles, such as for example containers of any shapes and/or dimensions, on a conveyor with two endless chains, belts or similar, characterized by two mechanisms solid respectively with both chains and by two plates transversally arranged with respect to the chains and mounted through their ends between these two mechanisms which permit the adjustment of the spacing of both plates between the chains.

According to another feature of the invention, the aforesaid mechanisms are each enclosed in a casing fixed on the chains and containing two racks engaging with a pinion and each coupled to one end of the plates.

More particularly, the racks are coupled to the ends of the plates through blocks slidably mounted in grooves provided in the casing.

According to another feature of the invention, a spiral spring is provided in the casing, which is mounted between the pinion bearing axis and a wall of the casing in order to continually draw back the aforesaid plates into close position.

According to another feature of the invention, the monitoring of the spacing of the plates is performed by a wedge-shaped piece which can be inserted between both plates, or by a lever solid with the axis of the pinion actuating both racks in a synchronized manner, whereby said lever can be monitored by any means, such as e.g. a ramp.

According to a particularly advantageous embodiment, each of the aforesaid plates is mounted in a free oscillating manner on a rod or similar coupled by its ends to the aforesaid blocks.

Therefore, the plates will be tiltable into any position to conform to containers, e.g. conical in shape.

Cradles, the shape of which corresponds to that of the containers or goblets, can be provided on the facing sides of the plates.

The invention concerns also a conveyor with chains, belts or similar, equipped with a device which meets one or the other of the aforementioned features.

BRIEF DESCRIPTION OF THE DRAWINGS

Other features and advantages of the invention will appear more clearly in the light of the following detailed description with reference to the appended drawings, given only by way of example, wherein:

FIG. 1 is a schematic perspective partial view of a conveyor equipped with a device according to the principles of the invention;

FIG. 2 is an end view of this device, in the direction of arrow II of FIG. 1;

FIG. 3 is a cross-sectional view of one of both identical mechanisms for monitoring the plates, on the line III—III of FIG. 2, showing said plates in close position;

FIG. 4 is identical to FIG. 3 but showing the plates in a fully spaced position;

FIG. 5 is a top view, with the lid being removed, of the casing containing the mechanism for actuating the plates;

FIG. 6 is a cross-sectional view on the line VI—VI of FIG. 5;

FIG. 7 is a schematic perspective view of a device according to the invention and which can be actuated by a wedge-forming piece;

FIG. 8 is a schematic perspective view of this device which can be actuated by levers or the like instead of being actuated by a wedge-forming piece;

FIG. 9 is a schematic end view of both plates mounted in an oscillating manner on rods coupled to the mechanisms which are solid with both chains of the conveyor.

DESCRIPTION OF THE PREFERRED EMBODIMENTS

Referring to FIG. 1, there is shown a conveyor 1 with two endless chains or belts 2, each of which bearing fixed on it a casing 3 which contains a mechanism coupled to the ends of both transverse plates or similar P and permitting the adjustment of the spacing of these two plates in order that they can seize between each other containers of any shape and/or dimension.

Of course, several devices of the above type are arranged, according to a certain pitch, in a transverse manner with respect to the chains or belts 2, as very schematically shown at 1a.

The facing sides of the panels P may include cradles 4 facing each other, as can be seen in FIGS. 1, 7 and 8, whereby these cradles may be made of a metal, a rubber or an appropriate synthetic material and may have a shape which substantially corresponds to that of the containers to be seized.

Referring more particularly to FIGS. 2 to 6, it is shown that the mechanisms enclosed within each casing 3 fixed on the chains 2 by a stirrup-shaped piece 5 consist substantially of two racks $C_1$ and $C_2$ engaging with a pinion 6 rotating about an axis 7 between both racks. Each of said racks includes at its end a block 8 to which one end 10 of both plates P is rigidly or preferably more or less loosely fixed, for example with the aid of a screw 9.

Thus, it will be understood that the rotation of the pinion 6 will provoke the driving of both racks $C_1$, $C_2$ in a synchronized manner, which will make the plates P come closer with respect to each other, as shown in FIG. 3, or to move apart from each other, as shown in FIG. 4.

The blocks 8 are slidably mounted in grooves 11 provided for example in the bottom wall 12 of the casing 3. Fixing elements for fixing the racks $C_1$, $C_2$ on the blocks 8 are shown at 13.

As clearly seen in FIG. 5, a spiral spring 14 is mounted between the axis 7 bearing the pinion 6, and a wall of the casing 3, which wall may be for example the lid of this casing and which can be seen at 15 in the FIGS. 2 and 6. This spiral spring 14 continually draws the plates P back into a close position, i.e. into a position for seizing the containers between the plates P. These plates, in a close or closed position around the containers, will perfectly conform to the shape of said containers, not only due to the presence of the cradles 4, but, as previously explained, because of the loose coupling of the ends 10 of the plates P on the blocks 8 bearing the racks $C_1$, $C_2$, thus advantageously enabling said plates P to absorb the small shape deformations of the containers which will be therefore strongly held.

As clearly shown in FIG. 7, the spacing of the plates P against the drawback force of the spiral spring 14 can be performed with the aid of a wedge-shaped piece 16 which can be formed, according to the illustrated example, by a simple plate 17 whose ends 18 are folded upward and are shaped as an isosceles trapezoid.

The piece 16 can be actuated by any appropriate means in order to come through the plates P and to separate them before a row of containers is inserted between these plates.

According to another embodiment, shown in FIG. 8, the simultaneous spacing of the plates P can be obtained with the aid of levers 19 solid with the actuating axis 7 of the pinion 6 which engages with both racks $C_1$ and $C_2$ to actuate them in a synchronized manner. The ends 20 of the levers 19 can be actuated by any means, such as for example a ramp which will permit the plates P to be spaced apart against the force of the drawing back spring 14.

As clearly shown in FIG. 9, the plates P may comprise on their outer face bearings or similar 21 through which the rod 22 passes, the ends of which are coupled, as afore-described, to the blocks 8 carrying the racks $C_1$, $C_2$. Thus, the plates P will be able to oscillate around the rods 22, which will enable the plates P to instantaneously adapt to the shape, e.g. conical, of a container to be seized. In other words, the plates P will be able to slant by themselves as they bear on the wall of the container.

The working of the device needs no further detailed explanation as it follows immediately from the preceding description.

However, it is to be noted that this device can be mounted on a chain conveyor intended to equip any machine for processing containers, which device permits the treatment of containers of various shapes and/or dimensions, whereby the seizing and also the releasing of these containers at the end of the processing has to be possible.

Of course, the invention is by no way limited to the described and illustrated embodiment which has been given only by way of example.

On the contrary, the invention includes all the technical equivalents of the described means as well as their combinations, in as much as these are carried out according to the spirit of the invention.

What is claimed is:

1. In a device for gripping and holding back articles or containers of any shape or dimension, comprising
    a conveyor having two chains or belts,
    two mechanisms, each solid respectively with one of both chains or belts, and
    two plates transversally arranged with respect to the chains or belts and mounted through ends thereof between said two mechanisms which permit adjustment of spacing of both plates between the chains or belts,
    the improvement comprising
    two casings, said mechanisms each enclosed in a respective casing which is fixed on a respective one of the chains or belts, and
    said mechanisms each comprise two racks and a pinion, each said rack engaging said pinion and each said rack coupled to one end of a respective one of the plates,
    whereby rotation of said pinion will drive said racks to either make the plates come closer together or move further apart.

2. A device according to claim 1, wherein each said mechanism additionally comprises
    blocks through which said racks are coupled to the ends of the plates, and additionally comprising
    grooves provided in said casing and in which said blocks are slidably mounted.

3. A device according to claim 1, which further comprises
    a shaft bearing said pinion and mounted upon said casing, and
    a spiral spring mounted between said shaft bearing the pinion and a wall of said casing so as to continually draw back a respective one of the plates into close position.

4. A device according to claim 1, additionally comprising
    a wedge-shaped piece which can be inserted between both plates for monitoring the spacing between the plates.

5. A device according to claim 1, wherein each said mechanism comprises blocks and rods through which said racks are coupled to the plates which are mounted in a free oscillating manner on said rods which are coupled at ends thereof to said blocks,
    so that the plates can turn about said rods to adapt to a shape of an article or container to be retained.

6. A device according to claim 1, wherein the plates include, on facing sides, cradles, the shape of which corresponds to that of the articles or containers.

7. A device according to claim 1, additionally comprising
    a shaft bearing said pinion and mounted upon said casing, and
    a lever solid with said pinion shaft for actuating both said racks in a synchronized manner.

* * * * *